Patented Mar. 27, 1945

2,372,528

UNITED STATES PATENT OFFICE 2,372,528

DEPOLYMERIZATION OF STYRENE POLYMERS

Frank J. Soday, Swarthmore, Pa., assignor to The United Gas Improvement Company, a corporation of Pennsylvania No Drawing. Application January 20, 1942, Serial No. 427,419

10 Claims. (Cl. 260—669)

This invention pertains generally to the depolymerization of styrene polymers.

More specifically, this invention pertains to the isolation of styrene in relatively pure form from a fraction or solution containing the same by subjecting said fraction or solution to polymerization conditions, replacing the unpolymerized material in said fraction or solution with a solvent or mixture of solvents having a boiling point or points substantially removed from that of the styrene present in the original fraction or solution, followed by depolymerizing the said polymer, and separating the added solvent or solvents from the depolymerized material.

Another object of the invention is the recovery of styrene from the still residues commonly obtained as a by-product of the fractionation of fractions or mixtures containing styrene by replacing the unpolymerized material with a solvent or mixture of solvents having a boiling point or boiling range different from that of monomeric styrene present in the still residue in the form of polymer, depolymerizing the said polymer, and separating the added solvent from the depolymerized material.

A further object of the invention is the depolymerization of polymer or polymers obtained from styrene by the application of heat to a solution of the said polymer or polymers when in the form of a thin layer or film, the solvent employed in making the said solution having a boiling point or points different from that of monomeric styrene.

Another object of the invention is the depolymerization of the said solution of such polymer or polymers in a solvent having a boiling point or points different from that of styrene by the application of heat thereto when in finely divided form.

Other objects and advantages of the invention will be apparent to those skilled in the art upon inspection of the following specification and claims.

In the various processes which have been developed for the manufacture of artificial gas, such as oil gas, carburetted water gas, or coal gas, considerable quantities of tar are produced, and the gas contains substantial quantities of readily condensible materials.

The condensate obtained from the artificial gas, as well as the light oil obtained upon distillation of the tar, constitute sources for many unsaturated and aromatic hydrocarbons. The light oil obtained from the pyrolysis of petroleum or of petroleum hydrocarbons is especially rich in unsaturated hydrocarbons, particularly when temperatures in excess of 1100° F. have been employed in the cracking operations. Among these unsaturated hydrocarbons is styrene.

Although the light oil from which styrene may be isolated has been available in commercial quantities for several decades, until recently no satisfactory processes have been developed for the utilization of this material sufficiently promising to warrant commercial exploitation. The so-called crude light naphtha in which it occurs has been used generally for the production of resins of inferior quality and dark color, as a cut-back for tar or asphalt, or for fuel purposes.

This lack of commercial utilization of light oil styrene can be directly traced to the lack of a satisfactory method for its isolation in a pure or relatively pure form.

As a result of extensive experimentation, I have discovered that pure or substantially pure styrene may be obtained in good yields by the polymerization of fractions or solutions containing styrene, replacing the unpolymerized material with a solvent or mixture of solvents having a boiling point, or boiling points, substantially different from that of styrene, followed by the depolymerization of the said solution, preferably in attenuated form, by the application of heat thereto, and separating the added solvent from the depolymerized material.

While any desired method may be used for the polymerization of the desired fraction or solution, the solvent used to prepare a solution of the styrene polymer, or polymers, is preferably carefully selected in accordance with the teachings hereinafter set forth, and the depolymerization of the polymer should be carried out under carefully controlled conditions in order to obtain satisfactory yields of styrene.

With respect to the type of solvent to be employed, I have discovered that a number of solvents commonly employed for dissolving hydrocarbon resins, particularly resins of the polystyrene type, are preferably not used, particularly for the production of the best grade of styrene, in the practice of the process to be more particularly described herein. Thus, for example, the use of halogen-containing solvents for this purpose, particularly those in which the halogen has a tendency to split off at elevated temperatures, frequently results in the production of styrene containing traces, or more, of halogen.

I have found that the presence of traces, or more, of halogen in styrene renders it relatively less desirable for the production of a good grade of polystyrene. Thus, such polymers frequently are yellow in color, their electrical properties are inferior, and they possess relatively poor thermal and mechanical properties. This is due, presumably to the inclusion of at least a portion of the halogen present in the finished polymer. However, where such conditions exist, and if desired, I may subject the resulting resin which may be of relatively less desirable quality to a refining treatment for the purpose of removing and/or inactivating undesirable impurities contained therein, thereby producing resins which may be fairly comparable in quality with those resins prepared from monomeric styrene having no such undesirable impurities. On the other hand, the resins containing traces, more or less, of impurities of the type indicated may be entirely satisfactory for certain purposes where color, and relatively somewhat inferior electrical, thermal and/or mechanical properties are of little or no importance, and consequently such resins may be used without further refining, if desired.

In addition, I have found that certain types of sulfur-containing compounds also are relatively less desirable solvents for styrene polymers prior to the depolymerization thereof. Thus mercaptans, disulfides, and certain other sulfur-containing compounds may decompose to some extent during the depolymerizing operations, forming free sulfur and/or sulfur-containing radicals which may subsequently react with the styrene present to give a product containing traces, or more, of sulfur. I have found that styrene containing traces, or more, of sulfur, or of sulfur compounds frequently produces polymers which are inferior to those obtained from sulfur-free styrene, particularly from the standpoint of their electrical properties.

However, as in the case when halogen-containing solvents are employed, the resulting resins may, if desired, be further refined to remove and/or inactivate any undesired impurities therein. Also as in the case when halogen-containing solvents are employed, the resulting resins may be entirely satisfactory for certain uses, and therefore may be employed in such cases without further refining or purification.

In addition, the use of numerous other types of commercial solvents is preferably avoided when depolymerizing styrene polymers due to their tendency to impart undesirable properties to the styrene obtained subsequently, such as imparting color or color-forming properties thereto.

The solubility characteristics of the solvents to be employed for this purpose preferably are also carefully investigated. Styrene polymers, particularly those having a fairly high molecular weight, are relatively, or almost completely, insoluble in certain of the materials frequently employed as solvents in the field of organic chemistry, such as esters and ethers. It will be obvious to those skilled in the art that the use of such materials is to be avoided, since they are not solvents as the term is employed herein.

In other words the term "solvent," unless otherwise qualified, is employed in the present specification and claims in the sense of a material having at least a substantial dissolving power for styrene polymer.

Finally, the solvent used for dissolving the styrene polymers prior to their depolymerization preferably should be relatively stable during the depolymerizing operation, among other reasons in order that it may be reused in the process, and to prevent contamination of the styrene obtained.

As a result of extensive experimentation, I have discovered that hydrocarbon solvents are particularly satisfactory for use in preparing styrene polymer solutions prior to the depolymerization thereof. In particular, I have found that aromatic-type solvents, such as benzene, toluene, and any other aromatic solvent boiling, or substantially all of which boils, below 140° C. or above 150° C. may be used for this purpose with excellent results. Even more desirable results may be obtained when the solvent boils, or substantially all of which boils, below 130° C. or above 160° C. Such boiling characteristics may for convenience be defined by stating that the solvent or solvents have no considerable portion boiling between the boiling point limits above set forth.

As an example of a solvent boiling substantially above 150° C. which may be employed with good results, there may be mentioned a solvent hydrocarbon fraction all, or a preponderant portion, of which boils between approximately 200° C. and approximately 240° C., said solvent fraction being essentially of a highly saturated aromatic nature, and being obtained from a relatively high boiling dead oil produced during the pyrolytic decomposition of petroleum oil such as during the manufacture of combustible gas with pyrolyzing temperatures above say 1100° F., said solvent fraction being further characterized in being relatively free from resin-forming unsaturated hydrocarbon components which are previously removed therefrom.

In addition, other hydrocarbon solvents also may be used with excellent results, especially if they contain a substantial proportion of aromatic and/or napthenic hydrocarbons and have no considerable portion boiling between 140° and 150° C., and more especially if they have no considerable portion boiling between 130° and 160° C. Such solvents as the foregoing are especially resistant to chemical action under the conditions obtaining throughout the process, and particularly during the depolymerization reaction.

The claimed subject matter of this application distinguishes from the claimed subject matter of my copending application Serial No. 409,681, filed September 5, 1941, in specifically claiming the replacing of unpolymerized material with a solvent for the polymer, of the character described, and in conducting the depolymerization of the polymer in the presence of the said added solvent.

In the case of the employment of a polymerizable solvent for the polymer reference is made to my copending application Serial No. 428,833 filed January 30, 1942.

Solvents boiling both above and below the boiling point, or boiling range, of styrene may be used for this purpose, or mixtures of such solvents may be employed, provided the boiling characteristics of such solvent, or mixtures of solvents, are as indicated above. Somewhat different procedures may be employed in substituting the desired solvent, or mixture thereof, for the unpolymerized material present in the polymerized light oil styrene fraction depending, among other things, upon the boiling point or range of the solvent or mixture of solvents employed for this purpose.

Thus, when a solvent having a boiling point or range substantially above that of styrene is used, the solvent or mixture of solvents may be added to the polymerized light oil styrene fraction, after which the unpolymerized material originally present may be removed by any desired method such as by distillation, resulting in a solution of styrene polymer in the desired solvent.

In the case of a solvent, or mixture of solvents, having a boiling point, or range, substantially below that of styrene, the unpolymerized material first is removed from the polymerized material, such as by distillation under reduced pressure with the aid of steam or an inert gas, or by spray drying methods, or otherwise, after which the polymer is dissolved in the desired solvent, or mixtures thereof. Thus, for example, the polymerized styrene fraction may be hardened by steam under reduced pressure in a suitable vessel, after which the desired solvent is introduced and the mixture thoroughly agitated until complete solution has been attained.

This latter method also can be used to prepare solutions of the styrene polymers in solvents having a boiling point or range above that of styrene, as well as for the preparation of solutions of the said polymers in a mixture of solvents having boiling points both above and below that of styrene.

While the styrene polymer solutions may be depolymerized by any desired method, such as by batch depolymerizing methods, I have found that excellent results may be obtained by the application of heat to solutions of such polymers in attenuated form.

An excellent source of styrene fractions which may be used as raw materials for the production of pure or substantially pure styrene according to the method disclosed herein are the light oils obtained from tars of the character previously described.

As a result of extensive experimentation, I have found that light oil fractions derived from oil gas and boiling within the range of approximately 135° to 155° C. contain substantial quantities of styrene. Thus, for example, the predominating unsaturated hydrocarbon present in light oil fractions boiling in the range of 140° to 150° C., and more particularly in the range of 142° to 148° C. is styrene.

The concentration and purification of the styrene contained in such fractions is complicated by the presence therein of various aromatic and naphthenic hydrocarbons having substantially similar boiling points, such as the isomeric xylenes. In addition, a number of other ordinarily undesirable impurities also are present in such fractions, such as sulfur, nitrogen, and oxygen-containing compounds, and acetylene derivatives, such as phenyl acetylene. The latter impurity is particularly undesirable as it inhibits the polymerization of styrene, resulting in the production of resins of very inferior quality.

Due to the presence in such styrene fractions of relatively large quantities of aromatic and naphthenic hydrocarbons having approximately the same boiling range, it has been found to be practicably impossible to isolate relatively pure styrene from such fractions by fractional distillation methods, even though columns having an efficiency of 100 plates or more have been utilized for this purpose. In addition, such methods have been attended by the loss of relatively large quantities of styrene in the form of polymers or still residues due to the pronounced tendency of styrene to polymerize under the influence of the elevated temperatures required in such fractional distillation operations. Although the quantity of such polymers obtained can be reduced substantially by the use of certain inhibitors such as hydroquinone, by the application of reduced pressures say of the order of 8 to 10 millimeters of mercury absolute, and by the use of fractionating columns designed to give a minimum pressure drop per theoretical plate, the quantity of polymers obtained under the most favorable conditions is still sufficiently large to preclude the possibility of obtaining acceptable yields of styrene fractions containing substantially more than 80% styrene. This is due to the fact that the rate of polymerization of styrene fractions increases with increasing concentration of such fractions. When a concentration of approximately 80% of styrene in a given fraction has been achieved by fractional distillation methods, the rate of increase of concentration of the styrene in such fractions by further fractionation is almost exactly counterbalanced by the increased rate of polymerization of the styrene present. Consequently, continued fractionation usually leads only to the conversion of larger quantities of the styrene present to polymers without increasing the concentration of such fractions to any substantial extent.

In addition to the foregoing, the use of fractional distillation methods for the concentration of styrene fractions almost invariably results in the similar concentration of certain of the undesirable impurities present in such fractions. Thus, for example, the fractional distillation of light oil fractions containing styrene invariably results in the isolation of fractions containing larger proportions of both styrene and phenylacetylene. As the latter compound is a very undesirable ingredient in styrene fractions, particularly when such fractions are to be used for the preparation of resins, in which case the phenylacetylene acts as a polymerization inhibitor and deleteriously affects the quality of the resins obtained subsequently, the improvement in the quality of the styrene fractions due to the increase in the concentration of the styrene contained therein is more than counterbalanced by the corresponding increase in the concentration of the phenylacetylene.

The isolation of pure or substantially pure styrene from fractions or solutions containing the same according to the method disclosed herein is free from the foregoing objections, since I have discovered that practically none of the impurities present in such fractions or solutions react in the same manner as styrene in the polymerizing and subsequent depolymerizing steps. Thus, for example, the polymerization of a light oil styrene fraction, the substitution of a solvent having a boiling point or points essentially different from that of styrene for the unpolymerized material present, and the depolymerization of the said polymer solution by the methods to be more particularly described herein, results in the isolation of pure or substantially pure styrene containing very little, if any, phenylacetylene.

What has been said with respect to the elimination of phenylacetylene by the application of the concentrating method described herein applies equally well to practically all of the other undesirable impurities present in fractions or solutions of styrene in general, such as other acetylenes, as well as oxygen, nitrogen, and sulfur-containing impurities.

It is apparent, therefore, that the application of the method described herein to styrene fractions or solutions results in (a) the concentration of the styrene present and (b) the elimination of a very considerable portion, if not all, of the undesirable impurities present.

Fractions or solutions containing almost any desired proportion of styrene may be used in the processes described herein. Thus, fractions containing as little as 1% styrene may be polymerized, a solvent having a boiling point substantially different from that of styrene substituted for the unpolymerized material present, the polymer solution subsequently depolymerized to form styrene, and the solvent and the styrene separated by any desired method, such as by distillation. However, I generally prefer to use fractions containing somewhat larger quantities of styrene, say 10% or more, for practicable reasons. Fractions or solutions containing 20%, or more, of styrene, such as from 30% to 80% or higher, are particularly desirable for this purpose.

The initial step in the isolation of styrene from fractions or solutions containing the same, namely, the polymerization of such fractions or solutions, may be carried out in any desired manner.

Thus, for example, such fractions or solutions may be polymerized by the application of heat. In general, an increase in temperature during such polymerizing processes results in a corresponding decrease in the time required to convert the styrene present to polymers and a decrease in the molecular weight of such polymers. As the low molecular weight polymers can be handled somewhat more easily in the depolymerizing processes described herein, due to their friable nature and the relative ease with which they may be dissolved in certain solvents, a preferred embodiment of this invention is the use of such low molecular weight polymers in such processes.

Thus, for example, light oil styrene fractions boiling in the range of 135° to 155° C. may be polymerized by the application of temperatures in the range of 120° to 200° C., or higher, for periods ranging from one to four days, for example, to give excellent yields of polymers which have a low molecular weight, are friable, and may be dissolved readily in aromatic solvents.

A friable polymer may be distinguished from a tough polymer in that the former cannot be readily molded without fracture whereas the latter can be very readily molded without fracture. In general a friable polymer may also be distinguished from a tough polymer in that it has a relatively low melting point for example below 150° C. by the capillary method.

Generally speaking, any desired polymerizing schedule may be employed and the polymerization may be carried out at any desired pressure, whether atmospheric or above or below, and in the presence of any desired gaseous substance, such as air, nitrogen, carbon dioxide, and the like.

In addition, catalysts may be used for the polymerization of such fractions or solutions, either alone or in combination with the simultaneous or otherwise, application of heat. Examples of such catalysts are peroxides, such as hydrogen peroxide, benzoyl peroxide, stearyl peroxide, and the like; contact materials such as clay, activated clay, carbon, activated carbon, silica gel, alumina, and the like; metallic halides and metallic halide-organic solvent complexes, and especially those which are characterized by readily hydrolyzing in the presence of water to give an acid reaction, such as aluminum chloride, boron trifluoride, aluminum chloride-diethyl ether complex, boron trifluoride-diethyl ether complex, and the like; ansolvo acids such as borofluoroacetic acid; mineral acids and mineral acid-organic solvent mixtures or reaction products, such as sulfuric acid and sulfuric acid-diethyl ether mixture; reactive metals such as sodium; and other catalysts or mixtures thereof.

After polymerization, such catalysts preferably are removed from the polymers prior to their depolymerization by the methods to be more particularly described herein. In the case of contact materials, such catalysts usually can be readily removed from the polymer solution by filtration or centrifuging. In the case of metallic halides and complexes thereof, ansolvo acids, and mineral acids, such acid-acting catalysts preferably are hydrolyzed or neutralized by the addition of an alkali or an aqueous solution of an alkali, followed by filtration or centrifuging to remove the hydrolysis products. Reactive metals may be removed by the addition of alcohol, followed by filtration.

Other methods of removing the catalysts employed in such processes may be used, if desired.

By the use of catalysts in conjunction with the use of elevated temperatures, polymers possessing almost any desired physical properties may be obtained. In addition, the complete conversion of the styrene present in a given fraction or solution may be accomplished in a minimum of time by the use of certain of the catalysts described in combination with the use of elevated temperatures.

The styrene present in a given fraction or solution may be converted to polymers possessing very low melting points by the use of certain catalysts in conjunction with the application of elevated temperatures. Thus, the polymerization of a light oil styrene fraction with activated clay at elevated temperatures resulted in the production of a polymer which was liquid at room temperatures. The use of such low melting or liquid polymers may be desirable in certain of the depolymerizing processes described herein, as will be more fully explained hereinafter.

By the use of rigorous polymerizing methods, dimers, trimers, and other relatively low molecular weight products may be obtained from styrene fractions or solutions. In general, it may be said that low molecular weight polymers of this type may be used in the depolymerizing processes of the type described herein.

Irrespective of the method employed in polymerizing the styrene fraction or solution, the next step in the process involves the substitution of a solvent having a boiling range substantially removed from that of monomeric styrene for the unpolymerized material present. The type of solvents which preferably are used for this purpose, and the method employed for substituting the desired solvent or solvents, or mixtures thereof, have been discussed previously. In general, it may be said that a solvent or mixture of solvents having a boiling point or points sufficiently different from that of styrene to be readily separable therefrom, and one which is sufficiently stable to be substantially unaffected by the elevated temperatures employed in the depolymerizing process and which does not impart any undesired properties to styrene subsequently obtained, preferably is employed for this purpose. Suitable solvents for this purpose include benzene and toluene, as well as other aromatic hydrocarbons boiling either below 140° C. or above 150° C., or still more preferably, either below 130° C. or above 160° C.; as well as mixtures of one or more relatively low boiling solvents with one or more relatively high boiling solvents, relative that is with respect to the boiling point of styrene.

Other methods of isolating the polymer may be used, if desired. Thus, for example, the polymer may be precipitated from its solution in the unpolymerized materials present by the addition of a non-solvent for the polymer therein, such as alcohol. The precipitated polymer then may be further processed to remove unpolymerized material, if desired, such as by working it on heated rolls, or otherwise.

The polymer solution also may be processed to remove unpolymerized material, among other ways, by spray drying methods such as by spraying the polymer solution into a heated tower, either alone or in conjunction with the use of steam or an inert gas to assist in removing the unpolymerized material, by working the material on hot rolls to remove unpolymerized material, or by other methods.

In either case, the styrene polymer subsequently is dissolved in a solvent having a boiling range substantially different from that of styrene prior to the depolymerization thereof.

It is preferred that all, or the substantial part, of the unpolymerized material originally present in such polymer solutions be removed prior to the depolymerization of the said polymer. Otherwise, such unpolymerized materials may contaminate the styrene obtained from the depolymerizing process.

In addition to the use of polymers prepared directly by the polymerization of fractions or solutions containing styrene, styrene polymers obtained from other sources also may be depolymerized by the process described herein to form monomeric styrene with excellent results.

A very satisfactory source of such polymers is the still bottoms or residues obtained as a by-product of the fractionation of solutions or fractions containing styrene. Thus, for example, light oil obtained from oil gas, or from other sources, commonly is fractionated to obtain fractions containing substantial proportions of styrene, among other unsaturated hydrocarbons. As pointed out previously, such fractionating steps result in the production of considerable quantities of polymers from the styrene present in such fractions, particularly when drastic fractionating methods are employed for the production of fractions containing substantial quantities of styrene. The still residues obtained from such processes are particularly well adapted to the production of styrene by the depolymerizing methods to be described herein.

In the treatment of still residues, the claimed subject-matter of this application distinguishes from the claimed subject matter of my copending application Serial No. 409,682, filed September 5, 1941, in specifically claiming the replacing of unpolymerized material with a solvent for the polymer, of the character described, and in conducting the depolymerization in the presence of the said added solvent.

As such still residues are commonly drained from the still pot or reboiler, either continuously or discontinuously, before all of the unpolymerized material has been distilled therefrom in order to assist in the removal of the still residues from the unit, such materials preferably are treated to remove all unpolymerized material present prior to the depolymerization of the styrene polymers. The methods discussed previously for the removal of unpolymerized material from polymerized styrene fractions or solutions may be used for this purpose with excellent results.

If desired, the still residues may be subjected to additional treatment, such as by the application of elevated temperatures and/or catalysts, in order to polymerize all of the styrene present prior to substituting another solvent or solvents of different boiling characteristics for the unpolymerized material present.

In addition to still residues, styrene polymers derived from the polymerization of styrene fractions or solutions under other conditions, such as the polymers obtained when such fractions or solutions are stored, shipped, or otherwise handled or treated, also may be used for the production of styrene according to the methods described herein.

Methods for the recovery of both purified styrene and purified ring-substituted methyl styrene from light oil fractions containing both styrene and ring-substituted methyl styrene involving polymerization followed by depolymerization of the resulting polymeric material are described and claimed in my copending applications Serial No. 427,418 filed January 20, 1942, and Serial No. 430,717 filed February 13, 1942.

The depolymerized material obtained usually comprises a mixture of added solvent and styrene, together with the other monomeric constituent or constituents of the copolymer and/or mixed polymer. Such mixture may be treated to recover styrene by any suitable means, if desired, such as by fractional distillation, suitably under reduced pressure. In this way monomeric styrene in good yields may be obtained, as well as good yields of the other monomeric compound or compounds which were present in the form of copolymer and/or mixed polymers, especially where the boiling point or points of the latter monomeric compounds differ sufficiently from that of the solvent to make separation thereof practicable. If desired, such other monomeric compound or compounds may be isolated by similar means, or otherwise, during the same or in a separate operation, depending in part upon the relation between the boiling point or points thereof and the boiling point or points of the particular solvent or solvents employed.

The solutions of styrene polymer or resin suitably dissolved in solvents of the type described herein may be introduced into the depolymerizing units to be described presently in any desired form. As pointed out previously in discussing the polymerization of styrene fractions or solutions, the polymers obtained may be in the form of high, medium or low-melting polymers or even liquid polymers. Low melting polymers are well adapted for use in the depolymerizing processes disclosed herein.

Thus, a mixture of solvent and polymer may be melted by the application of heat. By the use of this method, relatively small quantities of solvent and moderate temperatures may be employed in the production of a liquid mixture to be introduced into the depolymerizing unit. This may be advantageous in certain cases, particularly from the standpoint of solvent economy.

However, I generally prefer to use polymer solutions which are liquid at room temperature as such solutions may be handled with less difficulty than solutions containing less solvent.

The depolymerization of the foregoing solutions of styrene polymers may be carried out in the presence or absence of certain other diluents in the reaction zone, such as steam, other solvents, particularly relatively low boiling solvents such as propane, butane, pentane, petroleum ether, and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto, or otherwise.

The depolymerizing operations may be carried out at atmospheric, sub-atmospheric, or super-atmospheric pressures. In general, atmospheric or sub-atmospheric pressures are preferred.

As the majority of the styrene polymers are stable at temperatures below 300–350° C., temperatures above this range normally should be employed in order to obtain satisfactory yields of styrene within a reasonable period of time. I have found that the use of temperatures above 400° C. and, particularly, above 500° C., are very satisfactory for the production of styrene according to the methods described herein. Temperatures above 600° C. give excellent yields.

The polymer solution may be heated to any desired temperature prior to its introduction into the reaction zone, if desired. Thus, for example, it may be heated to an incipient decomposition temperature, or almost to this point, before being introduced into the reaction zone. In case a relatively low boiling solvent is present, the polymer-solvent mixture may be heated under a pressure sufficient to maintain the solvent in the liquid state at the chosen temperature prior to its introduction into the reaction zone.

An alternative method of introducing the polymer solution to the reaction zone comprises carbureting it with steam, a solvent or other liquid in the vapor state, an inert gas, or other suitable agent. This method is especially applicable to solutions of relatively low-melting polymers possessing an appreciable vapor pressure at temperatures below their initial depolymerizing temperature. Thus, for example, a solution of a liquid styrene polymer may be heated to a temperature of, say, 200° C. in a suitable vessel. A suitable carbureting medium such as, for example, superheated steam is passed through the heated liquid polymer solution, the mixture of steam and carburetted polymer solution then being delivered to the reaction zone. By a suitable control of the type of polymer solution employed, the temperature to which it has been heated, and the temperature of the steam employed for carbureting purposes, almost any desired ratio of steam and polymer solution may be delivered to the reaction zone.

Fairly high boiling solvents preferably should be employed for this purpose and/or the solvent present in the carburetor replenished from time to time. A relatively low melting type of polymer also is preferably employed. Otherwise, the solvent may be removed completely from the carburetor before all of the styrene polymer has been charged to the unit.

In the foregoing methods, the polymer solution may be delivered to the reaction zone in the form of a thin layer or stream, or in the form of a spray or mist of finely divided particles, depending, among other things, upon the type of fitting employed at the termination of the delivery pipe or other device in the reaction zone.

As pointed out previously, I have discovered that solutions of styrene polymers may be readily depolymerized to give good yields of the corresponding monomers by the application of heat to only a limited quantity of such polymer solutions at any given time. Any suitable procedure capable of meeting these conditions may be used for the depolymerization of solutions of styrene polymers.

Thus, for example, the polymer solution may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of styrene in good yields from solutions of its polymers by thermal depolymerization. In general, the clearance between the heated walls of such vessels and the agitator or scraper should preferably be less than ¼″ and, more preferably, less than ⅛″. Excellent results are obtained when the clearance between the two surfaces is 1/16″ or less, and optimum results may be obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of styrene by the thermal depolymerization of solutions thereof. The resin is distributed on the bottom and sides of the reactor by means of the agitator blade, the rate of flow of the resin and the depolymerizing temperature usually being so regulated that only a thin film of resin is present on the bottom and sides of the reaction vessel at any given period of time.

The foregoing represents one method of depolymerizing styrene polymer solutions by depositing such solutions in the form of a thin film, or otherwise, upon the interior of a reaction vessel, an agitator being employed to prevent or retard any undesirable accumulation of polymer upon the interior surface thereof. A large number of similar devices or units embodying the same principles may be employed for the depolymerization of styrene polymer solutions if desired.

It will be understood, of course, that the foregoing units only serve to illustrate one method of realizing the advantages of the invention and are not to be construed as limiting it in any way. In general, any method of depositing a relatively thin layer of the desired polymer solution upon a suitably heated surface will serve to depolymerize the polymer in a satisfactory manner.

Another suitable method for the depolymerization of styrene polymer solutions comprises contacting such polymer solutions with a molten metal, alloy, salt, mixture of salts, or other liquids capable of withstanding relatively high temperatures without appreciable decomposition. During the operation, the molten metal or other material may be agitated if desired.

The polymer solution may be delivered to the interior of the reaction vessel in any desired form, such as in the form of a thin stream, ribbon, or spray by the use of suitable constructions or devices on the lower end of the charging tube. Likewise, the polymer solution may be delivered above or below the level of the molten heating material in the unit. The polymer solution may be delivered to the unit as such, or in combination with one or more assisting agents such as steam, other solvents, gases, or the like.

During the operation of the unit, the molten metal or other material may be agitated to any desired extent, although such agitation is not necessary in all cases. The unit may be opened from time to time to remove any residual material present, or the molten metal may be removed, skimmed, and returned to the unit, either continuously, discontinuously, or otherwise. As a general rule, very little, if any, carbonaceous residues or other undesirable solid by-products are generated in the process due to the excellent contact between the heating medium and the material to be depolymerized.

An excellent method for the depolymerization of styrene polymer solutions comprises the application of heat thereto while in a very finely divided form. Any desired method of subdividing the polymer solution may be employed, such as pumping or forcing the polymer solution through a suitable nozzle, orifice, constriction, or fitting designed to subdivide the stream into a relatively large number of small, discrete particles. Other methods of accomplishing this purpose may, of course, be used if desired. Thus, for example, the polymer solution may be pumped, flowed, or otherwise delivered to the top of a suitable tower or vessel and permitted to flow over a perforated plate or screen, or both, or otherwise, in such manner as to disperse the material in the form of very thin streams, or drops, or otherwise.

Other methods and devices suitable for contacting the finely divided polymer solution may, of course, be employed. Thus, for example, the reaction vessel or tower may be conical in shape in order to prevent or retard any undue accumulation of polymer on the sides of the vessel. Other refinements will, of course, be apparent to those skilled in the art.

Another suitable method of depolymerizing styrene polymer solutions is to pump, blow or otherwise force such solutions through a tubular unit possessing a fairly narrow cross-sectional area, preferably while the polymer solution is in a finely divided or vaporized form, or otherwise. A pipe coil, tube bundle, or conventional cracking furnace may be used for this purpose with excellent results.

Other methods familiar to those engaged in the pyrolysis of petroleum may be used if desired. Other types of furnaces also may be employed, such as the de Florez furnace, a tube coil immersed in a molten metal bath, and the like.

In addition, the polymer solution or admixture may be charged to a conventional gas set, or a modification thereof, such as those employed for the production of blue gas, oil gas, carbureted water gas, and the like.

Other methods based upon heating a stream of finely divided styrene polymer solution, either alone or in conjunction with one or more assisting agents such as steam, another solvent, a gas, or a mixture thereof may be used, if desired.

It is to be understood, also, that any combination of the foregoing depolymerizing methods may be used for the production of styrene.

The method of condensing and cooling the depolymerized materials obtained also is important from the standpoint of obtaining good yields. The vapors preferably should be condensed and cooled as rapidly as possible in order to prevent any recombination and to prevent side reactions from occurring to any substantial degree. This may be accomplished by conducting the vapors into an efficient condenser and cooling as quickly as possible, a satisfactory condenser for this purpose being a water cooled shell and tube condenser. The depolymerized materials also may be shock-cooled if desired, such as by injecting a spray or stream of water or other cooling medium directly into the depolymerized products obtained from the reaction zone, or by passing the depolymerized vapors through a wash box filled with water, or otherwise.

In general, it may be said that the best results are obtained when the polymer solution is depolymerized in the form of thin films or small discrete particles or streams in the shortest possible period of time, then condensing and cooling the solvent and depolymerized products in the shortest possible period of time. Any undue increase in the depolymerizing time, or the time required to condense and cool the solvent and depolymerized materials, usually is reflected in decreased yields and in the presence of substantial quantities of higher boiling oils and other undesirable by-products in the styrene obtained.

The steam, solvents, gases, or mixtures thereof, which may be charged to the depolymerizing unit with the polymer solution assist in the reaction in many ways. They may serve to transmit heat directly to the polymer solution, to assist in sweeping out the products of the depolymerization from the reaction zone in the shortest possible period of time, and to serve as diluting agents, thus preventing, or reducing the rate of, the combination of the depolymerized materials.

By the use of the foregoing methods for the depolymerization of styrene polymer solutions, all of which are based upon the principle of exposing a limited quantity of a solution of the said polymer in a solvent having a boiling point substantially different from that of styrene to elevated temperatures for a limited period of time under conditions designed to effect a rapid transfer of heat from the heating surface of medium to the polymer solution, removing the solvent and depolymerized materials from the heating zone, and condensing and cooling them as rapidly as possible, excellent yields may be obtained.

The depolymerization preferably is carried out in a relatively short period of time. The application of elevated temperatures to styrene polymer solutions for prolonged periods of time, such as may be encountered, for example, in batch depolymerizing methods, may result in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone preferably rarely exceeds 10 minutes and, in most cases will not exceed 5 minutes. Contact times substantially under 5 minutes and, more particularly, under 1 minute, will be found to give excellent results.

By depolymerizing styrene polymer solutions, or mixtures of styrene polymer solutions with other materials according to the method described, particularly when units of the type illustrated are used for this purpose, excellent yields of styrene monomer may be obtained. Higher boiling oils and/or other undesirable by-products obtained during the polymerization are readily separable therefrom by distillation in view of their widely different boiling points. Thus, for example, the depolymerization of styrene polymers obtained from a light oil fraction boiling in the range of 135° to 155° C. may give yields up to 70% by weight of the original polymer, or even higher, when such polymers are depolymerized according to my invention.

After depolymerizing the styrene polymer solution, the next step comprises the separation of the solvent, or mixture of solvents, and the higher boiling by-products from the monomeric styrene, or mixture thereof.

A suitable method for separating monomeric styrene and the solvent or solvents, and other materials, present in the depolymerized product, particularly when the solvent or solvents employed are relatively inert, comprises the fractional distillation of such material. As styrene is readily polymerized by the application of heat, such fractional distillation preferably is carried out under reduced pressure and in the presence of inhibitors, such as hydroquinone. The use of continuous fractionating columns for this purpose is particularly desirable.

Due to the ease with which styrene may be polymerized by the application of heat, the use of solvents having a boiling point substantially below that of styrene results in a reduction of the quantity of polymers obtained during the fractionating operations. This is due to the fact that a fairly high reflux ratio may be employed in the early stages of the fractionation operations to effect a sharp separation between the solvent and the styrene present and, hence, at a fairly low operating temperature. After the solvent has been substantially completely removed, the styrene may be distilled at a relatively low reflux ratio, or without the use of any reflux to separate it from higher boiling by-products.

When a relatively high boiling solvent has been employed in the process, a fairly high reflux ratio preferably is employed during the distillation of the styrene in order to separate it from the higher boiling solvent and higher boiling by-products present. Under these conditions, a significant quantity of styrene may be converted to polymer.

On the other hand, the use of solvents having a boiling point or points above that of styrene may be advantageous from other standpoints. Thus in certain of the depolymerizing methods discussed, the use of a solvent having a boiling point above that of styrene is preferred since because of its relatively high boiling point it will remain in contact with the polymer during depolymerization thereof for a longer period.

In general, it may be said that a number of factors are preferably taken into consideration before deciding upon a solvent for styrene polymers prior to the depolymerization thereof. As previously indicated, solvents preferably employed are those capable of remaining passive under the thermal and other conditions obtaining, and which therefore, not only pass through the process substantially unchanged but which also may be readily removed or separated from the reaction products.

It is of course to be understood that higher boiling oils, if any, obtained in the depolymerization process may be separated from the styrene obtained therein prior to the use thereof by any suitable method such as for example, fractional distillation under reduced pressures or otherwise.

By the practice of my process, styrene of 98% purity and higher, is readily obtainable.

For the purposes of the specification and the claims the term "attenuated form" or its equivalent, unless otherwise modified is intended to embrace sheet form, spray form, discrete particle form, small stream form, filament form, vapor form and similarly subdivided forms adapted for rapid heat transfer throughout the body of the material in process.

For the purpose of the specification and the claims, the term "styrene fraction" is intended to include various partially polymerized forms thereof, such as the still residues obtained upon the distillation of such fractions.

While specific procedures for the depolymerization of styrene polymers in the form of solutions in solvents having boiling points substantially different from that of styrene have been particularly described, as well as the units in which such depolymerization may be conducted, it is to be understood that these are by way of illustration. Therefore, changes, omissions, additions, substitutions, and/or modifications may be made within the scope of the claims without departing from the spirit of the invention.

I claim:

1. A process for purifying styrene contained in a light oil styrene fraction contaminated with phenyl acetylene which comprises polymerizing said fraction, replacing unpolymerized material present with a relatively inert solvent for the polymer having no considerable portion boiling between 140° C. and 150° C., heating the polymer and said solvent in attenuated form under temperature conditions at least as high as 350° C. for a period of time sufficient to effect depolymerization but insufficient to cause the formation of a substantial quantity of high boiling oil, and recovering monomeric styrene in purified form and substantially less contaminated with phenyl acetylene.

2. A method for purifying styrene contained in a light oil styrene fraction contaminated with phenyl acetylene which comprises polymerizing said fraction by the application of heat to produce a mixture of unpolymerized material and polymer of styrene, replacing said unpolymerized material with a relatively inert solvent for said polymer having no considerable portion boiling between 140° C. and 150° C. and dissolving said polymer therein, heating the resulting solution in attenuated form under temperature conditions at least as high as 400° C. for a period of time sufficient to effect depolymerization but not exceeding five minutes, and recovering monomeric styrene in purified form and substantially less contaminated with phenyl acetylene.

3. A method for purifying styrene contained in a light oil styrene fraction boiling between 135° C. and 150° C. and contaminated with phenyl acetylene comprising polymerizing said fraction to produce a mixture of unpolymerized material and polymer of styrene, replacing said unpolymerized material with a relatively inert solvent for said polymer having no considerable portion boiling between 140° C. and 150° C. and dissolving said polymer therein, heating the resulting solution in attenuated form in the presence of a diluent in vapor phase and under temperature conditions between 400° C. and 600° C. for a period of time sufficient to effect depolymerization while removing and condensing resulting vapor phase material substantially as rapidly as formed to recover monomeric styrene in purified form and substantially less contaminated with phenyl acetylene.

4. A process for the purification of styrene contained in a light oil styrene fraction boiling between 135° C. and 155° C. and contaminated with phenyl acetylene which comprises heating said fraction to obtain a mixture of unpolymerized material and heat polymer, replacing said unpolymerized material with a relatively inert solvent for said polymer having no considerable portion boiling between 130° C. and 160° C. and dissolving said polymer therein, subjecting said polymer in attenuated form in solution in said solvent to temperature conditions between 350° C. and 600° C. for a period sufficient to cause depolymerization while removing and condensing resulting vapor phase material substantially as rapidly as formed to recover monomeric styrene substantially less contaminated with phenyl acetylene.

5. A method for purifying styrene contained in a light oil fraction contaminated with phenyl acetylene, which comprises fractionally distilling said light oil fraction thereby obtaining a still residue containing polymer including polymerized styrene, replacing unpolymerized material present in said still residue with a relatively inert solvent for said polymer having no considerable portion boiling between 140° C. and 150° C., subjecting the resulting mixture in attenuated form to heating under temperature conditions at least as high as 350° C. for a time sufficient to effect depolymerization but insufficient to cause the formation of a substantial proportion of high boiling oil, and recovering monomeric styrene in a form containing substantially less phenyl acetylene contamination.

6. A method of recovering purified styrene from a light oil fraction boiling between 135° C. and 155° C. and containing the same and containing contamination in the form of phenyl acetylene which comprises concentrating styrene in said fraction by the fractional distillation thereof, thereby obtaining a still residue containing polymerized material including polymerized styrene, replacing unpolymerized material in said still residue with a relatively inert solvent for said polymer having no considerable portion boiling between 140° C. and 150° C., subjecting the resulting solution in attenuated form to temperature conditions between 350° C. and 600° C. for a period of time sufficiently long to effect depolymerization while removing and condensing resulting vapor phase material substantially as rapidly as formed to recover monomeric styrene in purified form and less contaminated with phenyl acetylene.

7. A process for purifying styrene contained in a light oil styrene fraction boiling between 135° C. and 155° C. and contaminated with phenyl acetylene which comprises polymerizing said fraction, subjecting the resulting mixture of polymer and unpolymerized material to distillation conditions thereby removing unpolymerized material, dissolving said polymer in an inert solvent substantially all of which boils below 140° C., heating the resulting solution in attenuated form under temperature conditions between 350° C. and 600° C. for a period of time sufficient to effect depolymerization but insufficient to cause the formation of a substantial quantity of high boiling oil, and recovering monomeric styrene in purified form and substantially less contaminated with phenyl acetylene.

8. A process for purifying styrene contained in a light oil styrene fraction boiling between 135° C. and 155° C. and contaminated with phenyl acetylene which comprises polymerizing said fraction to produce a mixture comprising polymer of styrene and unpolymerized material, adding to said mixture a relatively inert solvent for said polymer substantially all of which boils above 150° C., removing unpolymerized material derived from said fraction from the resulting solution, heating the remaining solution of said polymer and said solvent therefor in attenuated form under temperature conditions between 350° C. and 600° C. for a period of time sufficient to effect depolymerization but insufficient to cause the formation of a substantial quantity of high boiling oil, and separating from said solvent by fractional distillation monomeric styrene in purified form and substantially less contaminated with phenyl acetylene.

9. A process for purifying styrene contained in a light oil styrene fraction boiling between 135° C. and 155° C. and contaminated with phenyl acetylene which comprises polymerizing said fraction to form a mixture comprising polymer of styrene and unpolymerized material, replacing said unpolymerized material with at least one solvent selected from the group consisting of benzene, toluene, and a highly saturated aromatic hydrocarbon fraction of the products of vapor phase petroleum oil pyrolysis having a preponderant portion boiling between approximately 200° C. and approximately 240° C. and dissolving said polymer therein, heating the resulting solution in attenuated form under temperature conditions between 350° C. and 600° C. for a period of time sufficient to effect depolymerization but insufficient to cause the formation of a substantial quantity of high boiling oil, and recovering monomeric styrene in purified form and substantially less contaminated with phenyl acetylene.

10. A process for purifying styrene contained in a light oil styrene fraction boiling between 135° C. and 155° C. and contaminated with phenyl acetylene which comprises polymerizing said fraction to obtain a mixture comprising polymer of styrene and unpolymerized material, replacing said unpolymerized material with a relatively inert solvent for said polymer having no considerable portion boiling between 140° C. and 150° C., heating said polymer and solvent therefor in attenuated form under temperature conditions between 350° C. and 600° C. for a period of time sufficient to effect depolymerization while removing and condensing resulting vapor phase material substantially as rapidly as formed, and subjecting the depolymerized material and solvent to fractional distillation at subatmospheric pressure and in the presence of a polymerization inhibitor to recover monomeric styrene in purified form and substantially less contaminated with phenyl acetylene.

FRANK J. SODAY.